United States Patent
Lombard et al.

(10) Patent No.: US 9,739,282 B2
(45) Date of Patent: Aug. 22, 2017

(54) ROTARY VALVE UNIT FOR TURBOCHARGER

(75) Inventors: Alain Lombard, Vosges (FR); Johann Kurtzmann, Paris (FR); Nicholas Serres, Vosges (FR); Jean-Jacques Laissus, Epinal (FR)

(73) Assignee: Honeywell International Inc., Morris Plains, NJ (US)

( * ) Notice: Subject to any disclaimer, the term of this patent is extended or adjusted under 35 U.S.C. 154(b) by 1002 days.

(21) Appl. No.: 13/885,255

(22) PCT Filed: Dec. 13, 2011

(86) PCT No.: PCT/US2011/064585
§ 371 (c)(1),
(2), (4) Date: May 14, 2013

(87) PCT Pub. No.: WO2012/082713
PCT Pub. Date: Jun. 21, 2012

(65) Prior Publication Data
US 2013/0251512 A1    Sep. 26, 2013

Related U.S. Application Data

(60) Provisional application No. 61/422,485, filed on Dec. 13, 2010.

(51) Int. Cl.
*F04D 29/00* (2006.01)
*F02B 37/18* (2006.01)
(Continued)

(52) U.S. Cl.
CPC ........... *F04D 29/00* (2013.01); *F01D 17/105* (2013.01); *F01D 17/141* (2013.01);
(Continued)

(58) Field of Classification Search
CPC .... F01D 17/105; F01D 17/141; F01D 17/148; F01D 17/165; F01D 17/167;
(Continued)

(56) References Cited

U.S. PATENT DOCUMENTS

| 3,047,006 A | 7/1962 | Transeau |
| 5,146,752 A | 9/1992 | Bruestle |

(Continued)

FOREIGN PATENT DOCUMENTS

| DE | 10 2005 045 387 A1 | 3/2007 |
| EP | 0 433 560 A1 | 6/1991 |

(Continued)

OTHER PUBLICATIONS

International Search Report and Written Opinion for Application No. PCT/US2011/064585; dated Mar. 7, 2012.

*Primary Examiner* — Igor Kershteyn
(74) *Attorney, Agent, or Firm* — John C. James

(57) ABSTRACT

A turbocharger system is disclosed, including a turbine and compressor and a rotary valve unit. The rotary valve unit comprises a fixed valve seat and a rotary valve member arranged coaxially with the valve seat. The valve member is disposed against the valve seat and is rotatable about the axis for selectively varying a degree of alignment between respective orifices in the valve seat and valve member. The valve unit includes a valve housing that defines a first flow passage and a second flow passage, and the valve member and valve seat are disposed in the second flow passage. A turbocharger system is also disclosed, including a turbine and compressor and the rotary valve unit. The rotary valve unit is coupled with the turbine such that exhaust gas that has passed through the turbine wheel is fed into the first flow passage of the rotary valve unit, and exhaust gas that has (Continued)

bypassed the turbine wheel is fed into the second flow passage of the rotary valve unit.

7 Claims, 14 Drawing Sheets

(51) Int. Cl.
| | | |
|---|---|---|
| *F16K 3/08* | (2006.01) | |
| *F01D 17/10* | (2006.01) | |
| *F01D 17/14* | (2006.01) | |

(52) U.S. Cl.
CPC ............ *F02B 37/183* (2013.01); *F16K 3/085* (2013.01); *F05D 2220/40* (2013.01); *Y02T 10/144* (2013.01)

(58) Field of Classification Search
CPC .... F02B 37/183; F04D 29/00; F04D 2220/40; F16K 3/085; Y02T 10/144
See application file for complete search history.

(56) References Cited

U.S. PATENT DOCUMENTS

| | | | |
|---|---|---|---|
| 2010/0322106 A1 | 12/2010 | Qiang | |
| 2011/0103936 A1* | 5/2011 | Lombard | ................ F01D 9/026 415/145 |
| 2011/0268559 A1* | 11/2011 | Lombard | .............. F01D 17/105 415/145 |
| 2013/0129486 A1* | 5/2013 | Lombard | ................ F01D 9/026 415/145 |
| 2013/0223995 A1* | 8/2013 | Lombard | ................ F01D 9/026 415/145 |

FOREIGN PATENT DOCUMENTS

| | | |
|---|---|---|
| EP | 1 388 785 A2 | 2/2004 |
| EP | 2 306 054 A1 | 4/2011 |
| WO | WO-03/044327 A1 | 5/2003 |

\* cited by examiner

ROTARY VALVE UNIT FOR TURBOCHARGER

BACKGROUND OF THE INVENTION

The present disclosure relates to exhaust gas-driven turbochargers, and relates more particularly to valve arrangements for regulating the flow of exhaust gas, for example to allow the exhaust gas to bypass the turbine under certain engine operating conditions.

In a conventional turbocharger, the turbine housing defines a bypass conduit located generally to one side of the main bore through the housing, and the bypass conduit is connected to the exhaust gas inlet or the volute of the housing via a bypass valve. The bypass valve typically is a swing or poppet style valve comprising a circular valve member that is urged against a flat valve seat surrounding the bypass passage opening. The valve usually is arranged such that the exhaust gas pressure acts on the valve member in a direction tending to open the valve. One drawback associated with such an arrangement is that it is difficult to completely seal the valve in the closed position, since gas pressure tends to open the valve. Leakage past the closed bypass valve is a cause of performance degradation of the turbine and, hence, the turbocharger and its associated engine. The typical solution to the leakage issue is to preload the bypass valve member against the valve seat, but often this does not fully eliminate leakage, and in any event it causes additional problems such as an increase in the required actuation force for opening the valve.

Furthermore, swing or poppet valves tend to be poor in terms of controllability, especially at the crack-open point, and it is common for the bypass flow rate to be highly nonlinear with valve position, which makes it very difficult to properly regulate the bypass flow rate. This leads to problems such as poor transient response of the turbocharger and engine system.

Applicant's co-pending U.S. patent application Ser. Nos. 12/611,816 and 12/711,434 describe previous developments by the assignee of the present application, directed to improved bypass valve arrangements in turbocharger turbine components. The present application represents a still further development of this concept.

BRIEF SUMMARY OF THE DISCLOSURE

The present disclosure describes various embodiments of a rotary valve unit that seeks to address issues such as the ones noted above. In one embodiment, a rotary valve unit comprises a valve housing defining a space therein, a fixed valve seat mounted in the space, and a rotary valve member mounted in the space and arranged coaxially with the valve seat relative to an axis. The valve seat and valve member both define orifices extending through these parts. The valve member is disposed against the valve seat and is rotatable about the axis for selectively varying a degree of alignment between respective orifices in the valve seat and valve member, ranging from no alignment defining a closed condition of the bypass valve, to at least partial alignment defining an open condition of the bypass valve. Exhaust gas pressure urges the valve member against the valve seat whether the valve is closed or open.

An advantage of this rotary valve unit is that exhaust gas pressure acts on the valve in a direction tending to improve, rather than hinder, sealing, in contrast to the aforementioned swing and poppet style valve arrangements.

A further advantage is that the valve can achieve better controllability than is typically possible with swing or poppet valves, particularly at the crack-open point.

In a particular embodiment, the valve member defines a plurality of valve member orifices therethrough, the valve seat defines a plurality of valve seat orifices therethrough, and each valve member orifice has a corresponding valve seat orifice.

The valve member in one embodiment is a generally flat disk and the valve member orifices are circumferentially spaced apart about a circumference of the valve member. Similarly, the valve seat is a generally flat disk having the valve seat orifices circumferentially spaced apart in correspondence with the valve member orifices, and there is sufficient circumferential distance between adjacent valve seat orifices to accommodate the valve member orifices therebetween in the closed condition of the valve. In other words, in the closed condition there is no overlap between the valve member orifices and the corresponding valve seat orifices.

The valve can include features facilitating sealing between the valve member and valve seat. In one embodiment, either the valve member or the valve seat includes raised pads surrounding the respective orifices therein, and the pads are in contact with a substantially planar surface of the other of the valve member and the valve seat so as to provide sealing between the valve member and the valve seat.

The orifices can have various shapes, including circular or non-circular. In one embodiment, the orifices are longer in the radial direction than in the circumferential direction. The orifices can be circumferentially spaced uniformly or non-uniformly.

The valve unit also includes a drive system for effecting the needed rotational movement of the valve member. In one embodiment, the drive system includes a rotary drive member extending in a direction generally transverse to the axis about which the valve member rotates, and a drive arm attached to a distal end of the rotary drive member. A distal end of the drive arm engages the valve member such that rotation of the rotary drive member causes the drive arm to rotate the valve member about the axis. The drive system can further comprise a link attached to a proximal end of the rotary drive member, and a linear actuator having an actuator rod, the actuator being operable to extend and retract the actuator rod. A distal end of the actuator rod is connected to the link such that extension of the actuator rod causes the link to rotate the rotary drive member in one direction and retraction of the actuator rod causes the link to rotate the rotary drive member in the opposite direction.

Another embodiment of the valve unit allows two separate streams of exhaust gas to pass through the valve unit and remain separate from each other. In this embodiment, the valve member defines a plurality of first or outer valve member orifices and a plurality of second or inner valve member orifices. The outer valve member orifices are circumferentially spaced apart about the axis and located at a relatively greater radial distance from the axis, while the inner valve member orifices are circumferentially spaced apart about the axis and located at a relatively smaller radial distance from the axis. That is, the outer valve member orifices are arranged in a ring that is radially outward of and concentrically surrounds the ring of the inner valve member orifices. Correspondingly, the valve seat defines a plurality of outer valve seat orifices and a plurality of inner valve seat orifices. The outer and inner valve seat orifices are arranged in concentric rings substantially as for the orifices of the valve member, so that the outer valve member orifices and the outer valve seat orifices lie at substantially the same radial distance from the axis, and the inner valve member orifices and the inner valve seat orifices lie at substantially the same radial distance (smaller than that of the outer orifices) from the axis.

In some embodiments of the valve unit, the housing assembly defines a central flow passage that is separate from an annular flow passage surrounding the central flow passage, and the valve seat and valve member are generally ring-shaped parts disposed in the annular flow passage. This arrangement allows a flow of gas (e.g., exhaust gas that has already passed through the turbine wheel of a turbocharger) to pass through the central flow passage, while flow through the annular flow passage is prevented when the valve is closed. When the valve is open, a flow of gas (e.g., exhaust gas that has bypassed the turbine wheel of a turbocharger) can pass through the annular flow passage.

In other embodiments of the valve unit, the housing has a generally "Y"-shaped configuration that defines a first flow passage and a separate second flow passage both of which feed into a third flow passage at their downstream ends. The valve member and valve seat are disposed in the second flow passage. When the valve is closed, flow through the second flow passage is prevented, while flow through the first flow passage into the third flow passage is possible. When the valve is open, flow through the second passage into the third flow passage is possible. This valve unit embodiment can be used, for example, as a bypass valve connected between a first turbine of a first turbocharger and a second turbine of a second turbocharger. A discharge flow passage of the first turbine can be connected to the first flow passage of the valve unit, while a bypass flow passage of the first turbine is connected to the second flow passage of the valve unit. The third flow passage of the valve unit is connected to the inlet of the second turbine. Accordingly, when the valve is closed, all exhaust gas entering the turbine housing of the first turbine must flow through the turbine wheel of the first turbine and then through the first and third flow passages of the valve unit into the second turbine. When the valve is fully open, the vast majority of exhaust gas entering the first turbine bypasses the turbine wheel of the first turbine and flows through the second and third flow passages of the valve unit into the second turbine. When the valve is partially open, some exhaust gas passes through the turbine wheel of the first turbine while the remainder of the exhaust gas bypasses the turbine wheel of the first turbine, and both of those streams are joined together in the third flow passage of the valve unit and flow into the second turbine.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
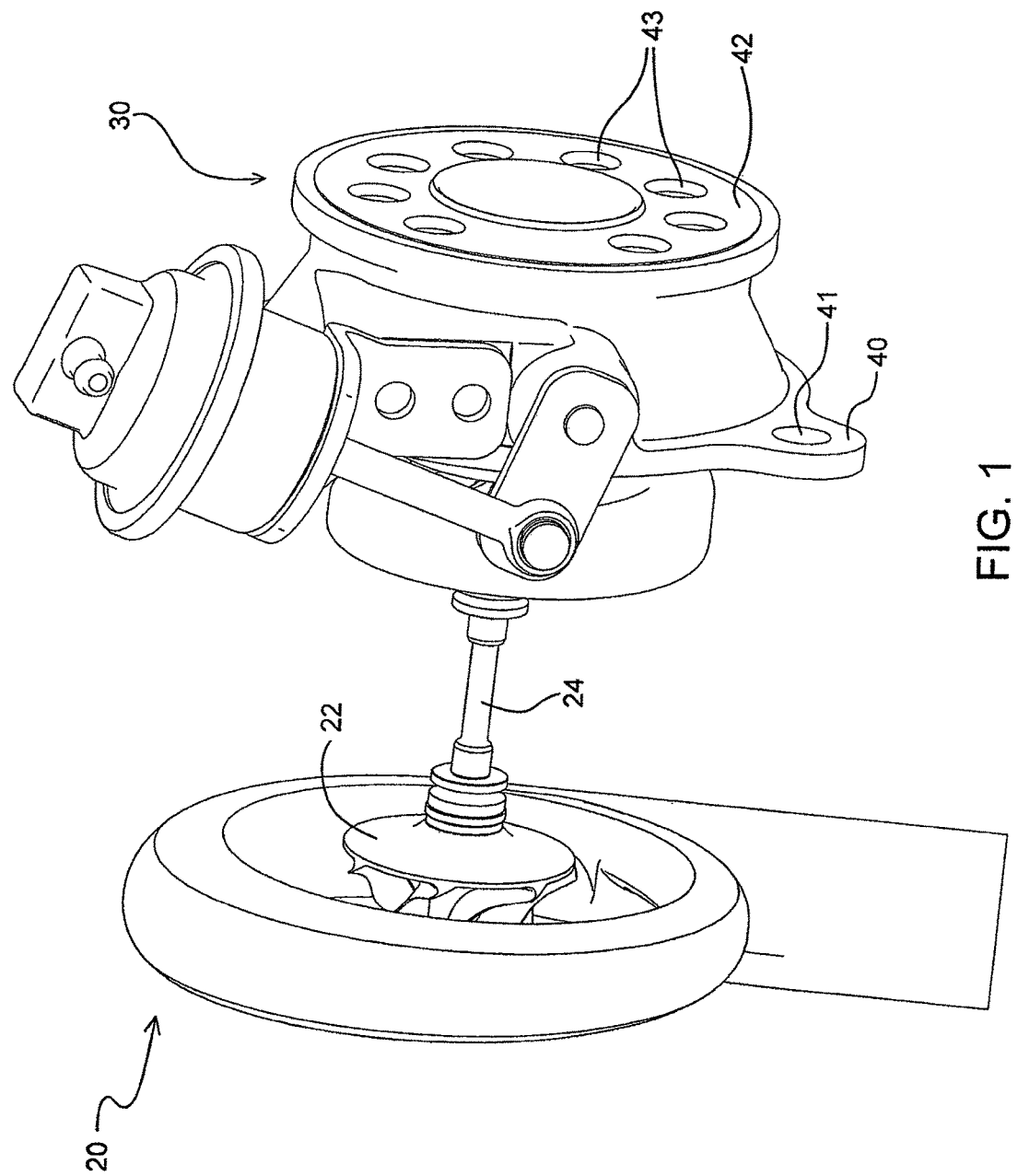
FIG. 1 is a perspective view of an assembly comprising a turbocharger and a rotary valve unit in accordance with one embodiment of the present invention.
Figure 2:
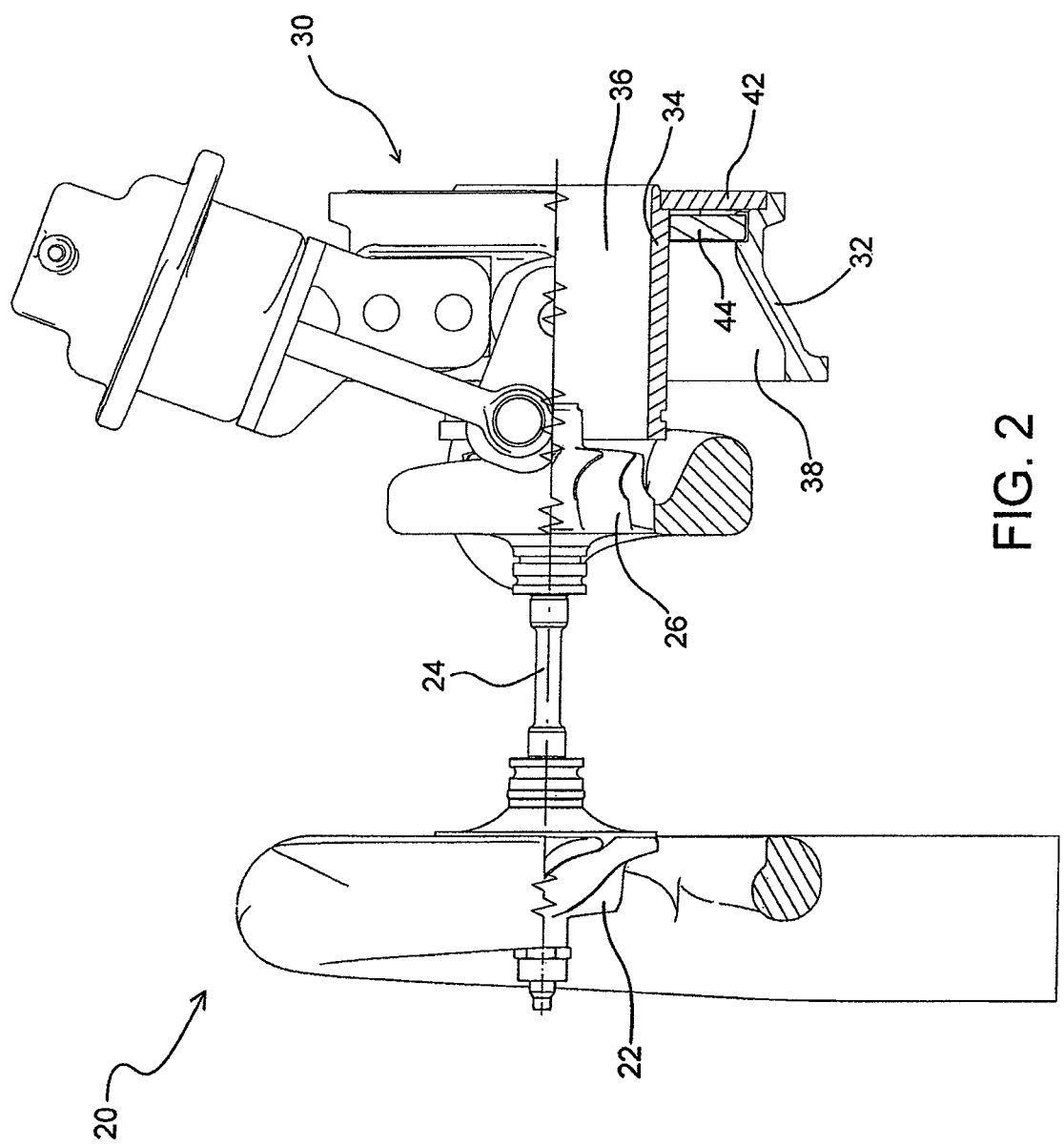
FIG. 2 is a side view of the assembly of FIG. 1, shown partly in section.

A turbocharger assembly 20 in accordance with one embodiment of the present invention is shown in FIGS. 1 and 2. The turbocharger assembly 20 includes a turbocharger, essential components of which are shown in FIGS. 1 and 2, but parts of which have been omitted for clarity of illustration. In particular, FIGS. 1 and 2 depict the compressor wheel 22 joined to one end of a shaft 24, the other end of the shaft 24 being joined to a turbine wheel 26. Respective volutes for the compressor wheel 22 and turbine wheel 26 are shown only schematically in FIGS. 1 and 2. It will also be recognized that the compressor housing, center housing (with associated bearings for the shaft 24), and turbine housing of the turbocharger have been omitted from these figures. The turbocharger assembly 20 further includes a rotary valve unit 30 coupled to the turbine of the turbocharger for regulating exhaust gas flow through the turbine.

Figure 3:
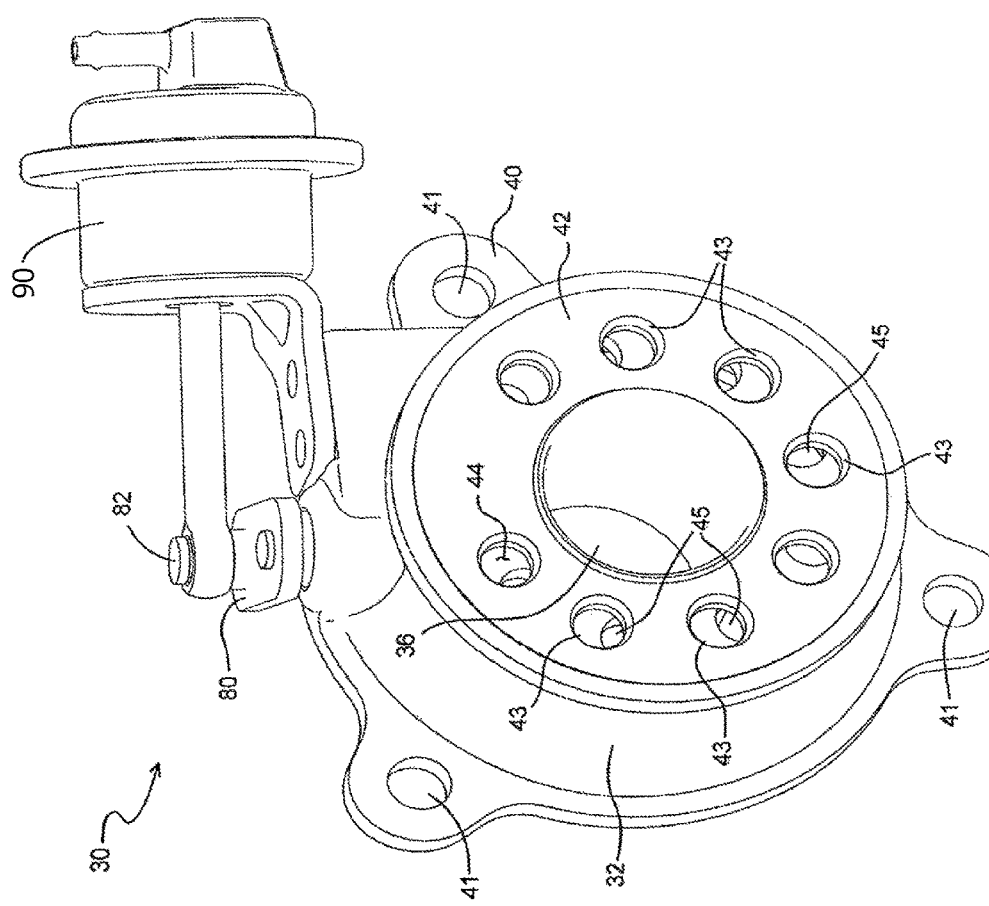
FIG. 3 is a further perspective view of the assembly of FIG. 1.
Figure 4:
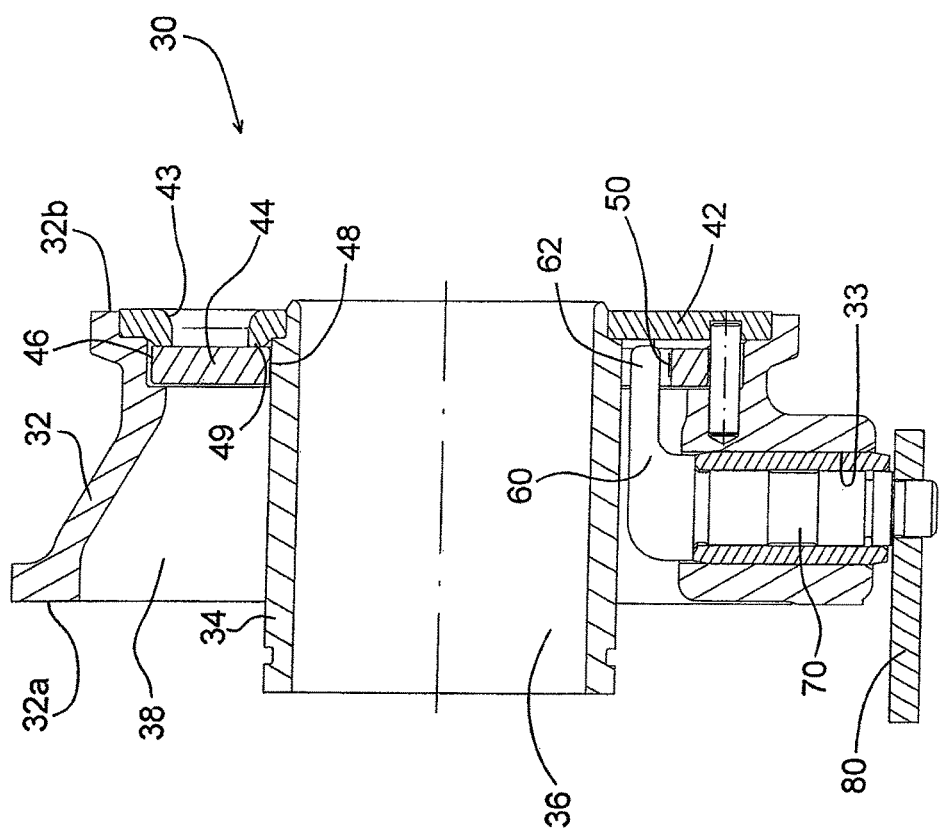
FIG. 4 is an axial cross-sectional view of the rotary valve unit included in the assembly of FIG. 1.

With reference particularly to FIGS. 2 through 4, the rotary valve unit 30 includes a valve housing assembly comprising a main housing 32 and a housing insert 34. The main housing 32 defines a passage extending through the main housing from a first side 32a to a second side 32b thereof. The housing insert 34 comprises a generally tubular member that is disposed in the passage of the main housing such that the interior of the housing insert 34 defines a central flow passage 36, and an annular space between the outer surface of the housing insert 34 and an inner surface of the main housing 32 defines an annular flow passage 38 that surrounds the central flow passage 36.

The valve unit 30 further comprises a stationary valve seat 42 and a rotary valve member 44 in abutting engagement with the valve seat. The valve seat 42 and valve member 44 are arranged in the annular space between the main housing 22 and the housing insert 34. The valve member 44 is prevented from moving axially upstream by a shoulder defined by the main housing 32, although during operation pressure of the exhaust gas urges the valve member 44 in the downstream direction. The valve member 44 is not constrained by the main housing but is free to rotate about its axis and to move axially against the valve seat 42. The valve seat 42 is prevented from moving axially, radially, or rotationally. A radially outer edge portion of the upstream face of the valve seat 42 (i.e., the left-hand face in FIG. 4) abuts a shoulder defined by the main housing 32, and the radially inner edge portion of the upstream face abuts a shoulder defined by the housing insert 34, thereby putting the valve seat in a precise axial location as dictated by these shoulders.

The valve seat 42 is a generally flat ring-shaped or annular member having a plurality of orifices 43 circumferentially spaced apart about a circumference of the valve seat, the orifices 43 extending generally axially between the upstream and downstream faces of the valve seat. The orifices 43 can be uniformly or non-uniformly spaced about the circumference of the valve seat.

The rotary valve member 44 is a generally flat ring-shaped or annular member having a plurality of orifices 45 (FIG. 3) circumferentially spaced apart about a circumference of the valve member, the orifices 45 extending generally axially between the upstream and downstream faces of the valve member. The orifices 45 can be uniformly or non-uniformly spaced about the circumference of the valve member. The number and spacing of the orifices 45 in the valve member can be the same as the number and spacing of the orifices 43 in the valve seat. However, as further described below, non-uniform spacing of the orifices 45 is also possible and can be advantageous in some circumstances; furthermore, the spacings of the orifices 43 and 45 do not have to be the same, and in some cases it can be advantageous for the spacings to be different. The valve member 44 has a substantially circular cylindrical outer edge 46 and a substantially circular cylindrical inner edge 48, the outer and inner edges 46, 48 being coaxial with respect to a central longitudinal axis of the valve member, which axis is also substantially coincident with a central longitudinal axis of the valve seat 42. The main housing 32 and the housing insert 34 both define substantially circular bearing surfaces for the outer and inner edges 46, 48 of the rotary valve member 44 and there are clearances therebetween, so that the valve member can be rotated in one direction or the opposite direction about its central longitudinal axis in order to vary a degree of alignment between the valve member orifices 45 and the valve seat orifices 43, as further described below.

The valve member 44 further defines a slot or opening 50 to receive the distal end 62 of an L-shaped drive arm 60 that is rigidly affixed to a distal (radially inner) end of a rotary drive member 70. The rotary drive member 70 passes through a bushing installed in a bore 33 defined in the main housing 32 (see FIG. 4), the bore 33 connecting with the annular flow passage 38. The proximal (radially outer) end of the rotary drive member 70 is located outside the main housing 32 and is rigidly affixed to a link 80. An actuator 90 is provided for rotating the rotary drive member 70. The actuator 90 is affixed to the valve housing 32 by a bracket 92. The link 80 has a connecting member 82 (FIG. 3) that is offset from the rotation axis of the rotary drive member 70 and that can be coupled to an actuator rod of the actuator 90 such that extension of the actuator rod causes the link 80 to rotate the rotary drive member 70 in one direction and retraction of the actuator rod causes the link to rotate the rotary drive member in the opposite direction. As a result, the drive arm 60 affixed to the distal end of the rotary drive member 70 in turn causes the valve member 44 to be rotated in one direction or the opposite direction about its axis.

With reference particularly to FIG. 4, each of the orifices 43 in the valve seat 42 has a raised pad 49 surrounding it. The pads 49 abut the planar face of the valve member 44 and serve as seals to help seal the interface between the valve member and valve seat. The provision of the raised pads 49 reduces the total surface area of the valve seat 42 in frictional contact with the rotary valve member 44, thereby reducing the total friction forces that the actuation system must overcome to rotate the valve member.

As depicted in FIGS. 1 and 2, the valve unit 30 is coupled to the turbine of the turbocharger so that exhaust gas that has passed through the turbine wheel flows through the central flow passage 36 of the valve unit. A bypass passage (not shown) of the turbine is connected to the annular flow passage 38 of the valve unit. When the valve unit 30 is closed (i.e., there is no overlap between the valve seat orifices 43 and the valve member orifices 45), flow through the annular flow passage 38 is prevented, and accordingly all of the exhaust gas entering the turbine housing must flow through turbine wheel 26 and then through the central flow passage 36 of the valve unit. When the valve unit is fully open (i.e., there is maximum overlap between the orifices 43 and 45), exhaust gas can flow through the annular flow passage 38 and thus the vast majority of the exhaust gas entering the turbine housing will bypass the turbine via the bypass passage and the annular flow passage 38. When the valve unit is partially open, some exhaust gas may pass through the turbine wheel and the remainder bypasses the turbine wheel.

The housing 32 of the valve unit 30 defines a mounting flange 40 having holes 41 for fasteners for mounting the valve unit on another component such as an engine cylinder head.

The arrangement depicted in FIGS. 1 through 4 and described above is particularly suited to an "in-line" turbocharger/engine installation in which the turbine bypass passage is configured to direct the bypass flow in the axial direction (i.e., in the same direction as the turbine wheel outlet flow), and in which the catalytic converter (not shown) also has an in-line orientation such that exhaust gas flows in the axial direction into the catalytic converter. In this axial in-line design, the overall engine layout has a horizontally oriented catalytic converter located as close as possible to the turbine outlet flange, such that both the turbine wheel outlet flow and the bypass flow from the rotary valve unit are both used to optimize catalyst light-off response.

Figure 5:
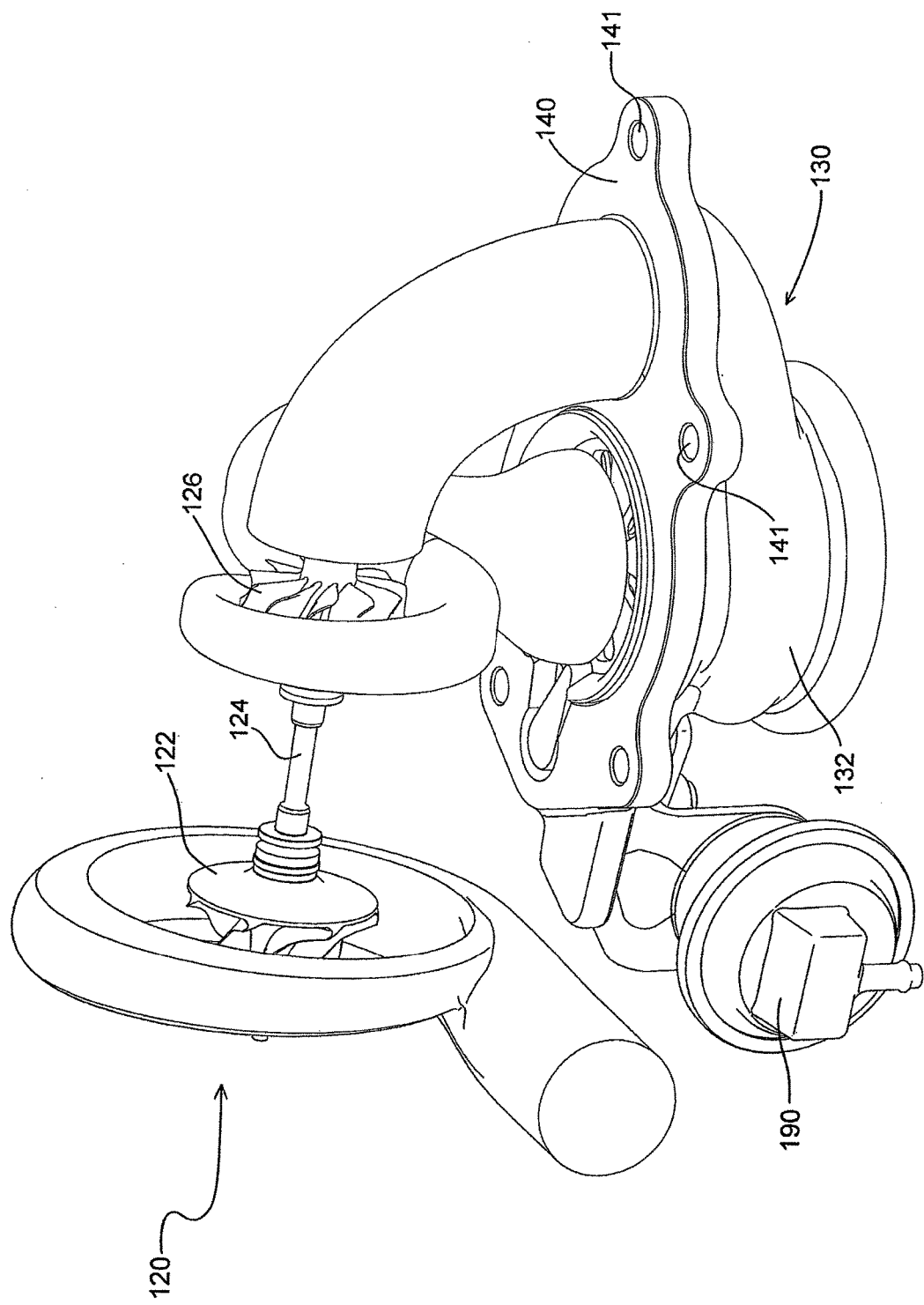
FIG. 5 is a perspective view of an assembly comprising a turbocharger and a rotary valve unit in accordance with another embodiment of the present invention.
Figure 6:
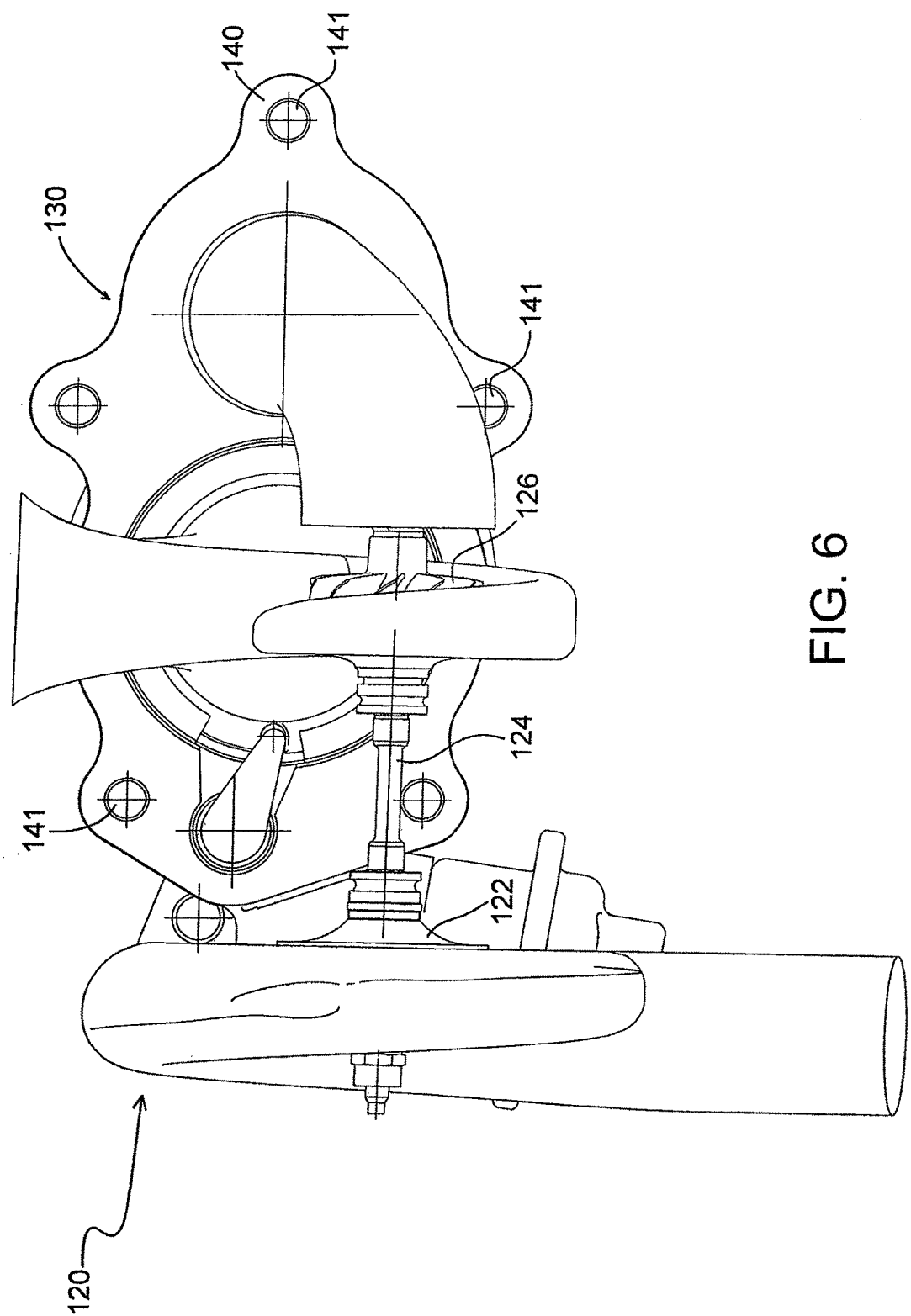
FIG. 6 is a side view of the assembly of FIG. 5.
Figure 7:
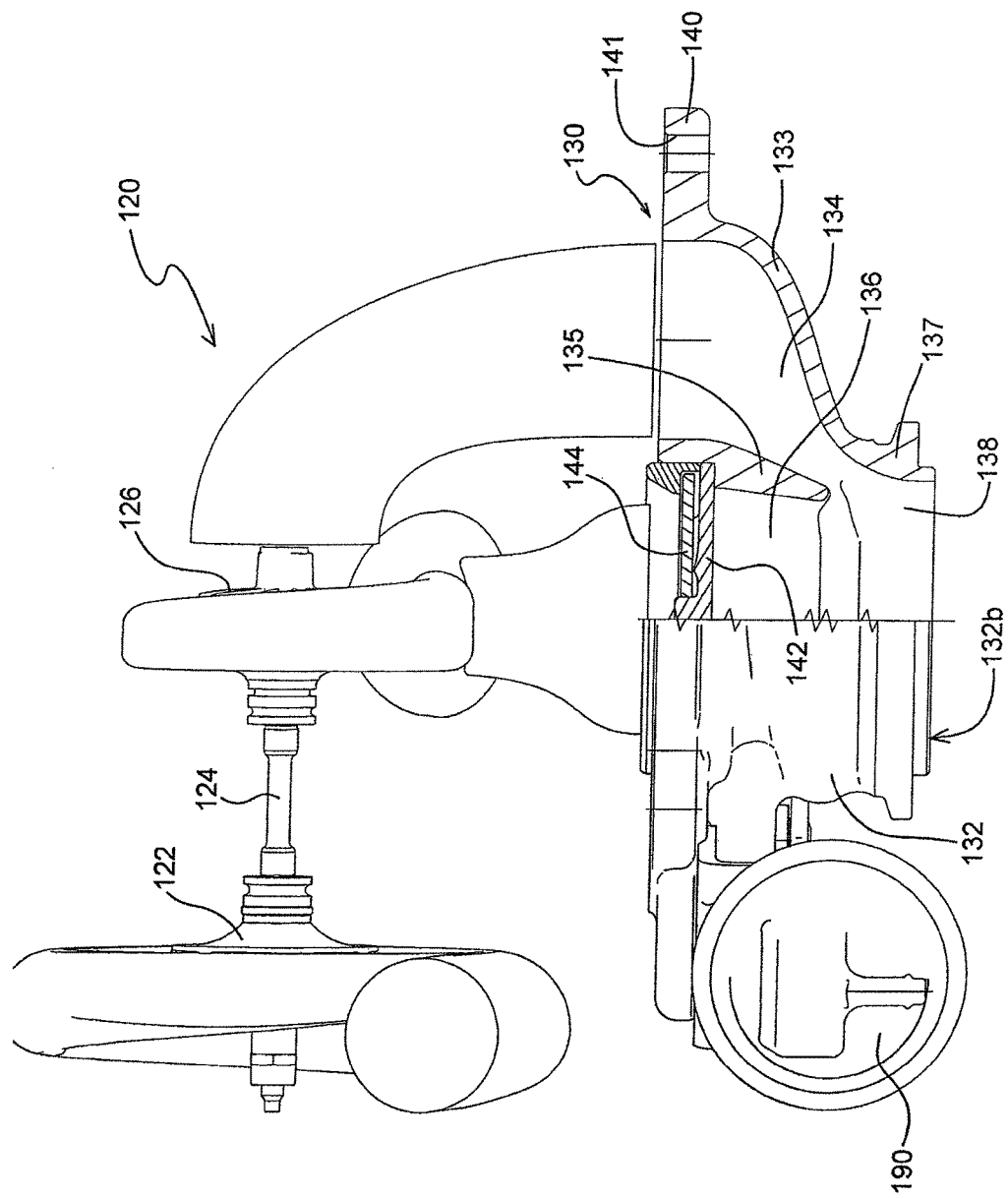
FIG. 7 is a side view of the assembly of FIG. 5, shown partly in section.

A further embodiment of the invention is depicted in FIGS. 5 through 10. In contrast to the above-described arrangement, the arrangement depicted in FIGS. 5 through 10 is particularly suited to a turbocharger/engine installation having a vertically oriented catalytic converter located at the turbine inlet volute or at the engine exhaust manifold outlet. FIGS. 5 through 7 depict a turbocharger assembly 120 that includes a turbocharger, essential components of which are shown in FIGS. 5-7, but parts of which have been omitted for clarity of illustration. In particular, FIGS. 5-7 depict the compressor wheel 122 joined to one end of a shaft 124, the other end of the shaft 124 being joined to a turbine wheel 126. Respective volutes for the compressor wheel 122 and turbine wheel 126 are shown only schematically in FIGS. 5-7. It will also be recognized that the compressor housing, center housing (with associated bearings for the shaft 124), and turbine housing of the turbocharger have been omitted from these figures. The turbocharger assembly 120 further includes a rotary valve unit 130 coupled to the turbine of the turbocharger for regulating exhaust gas flow through the turbine.

Figure 8:
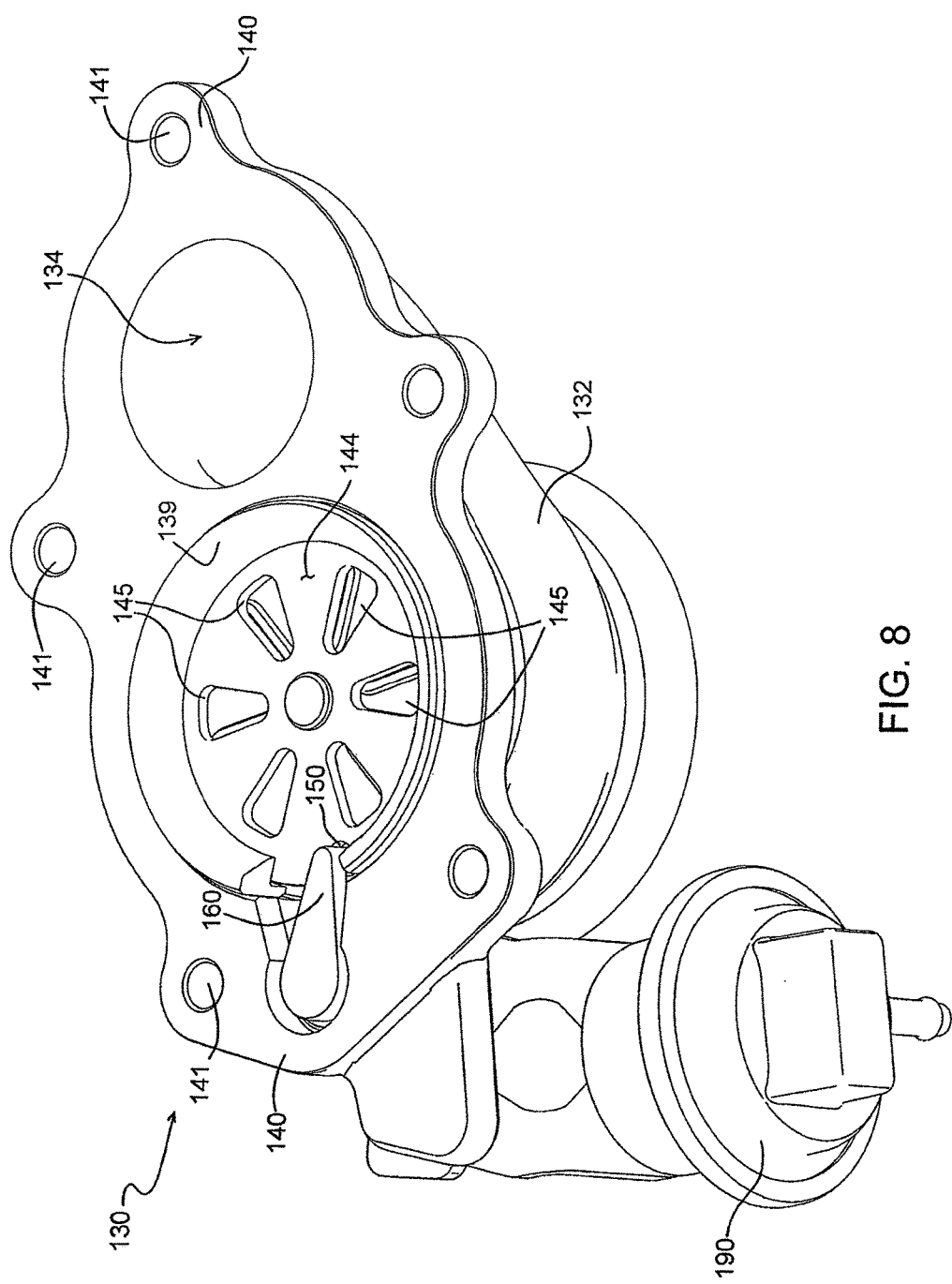
FIG. 8 is a perspective view of the rotary valve unit used in the assembly of FIG. 5.
Figure 9:
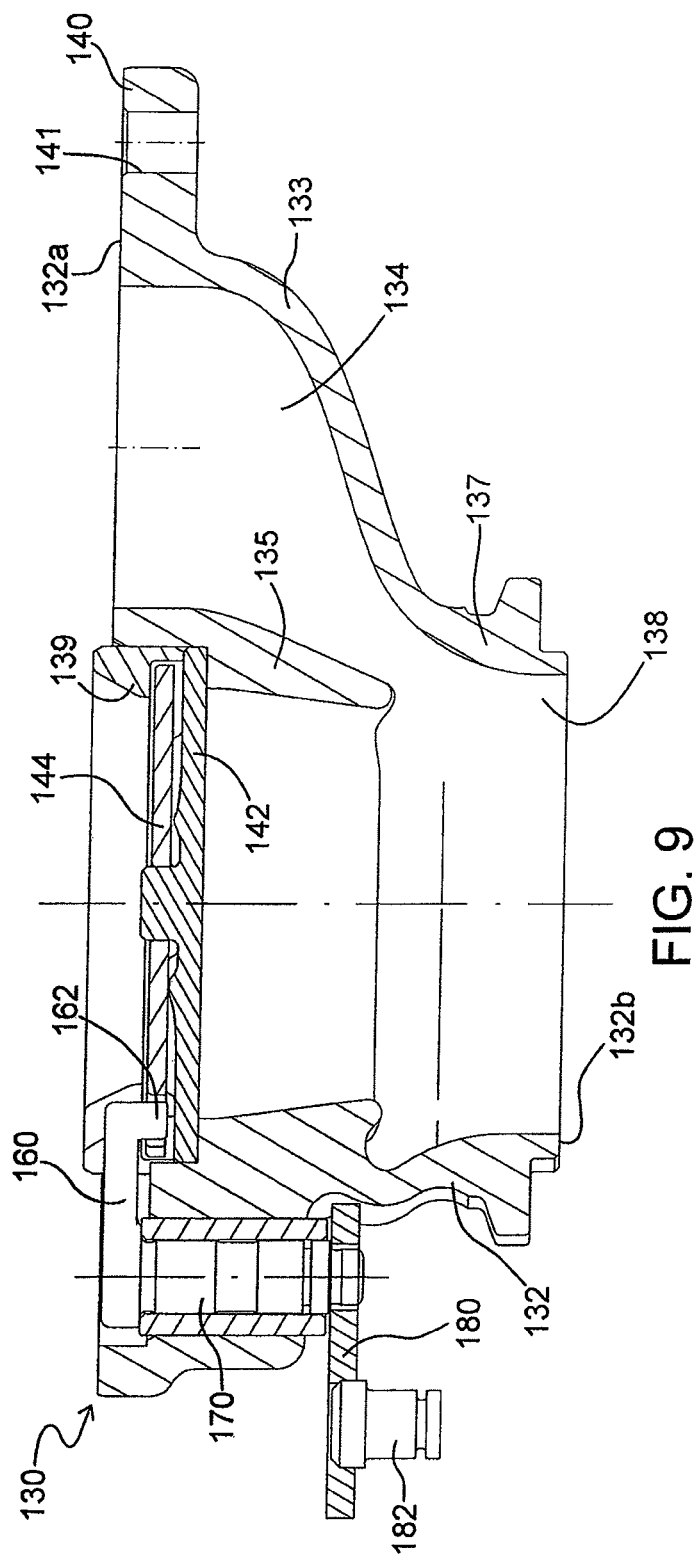
FIG. 9 is an axial cross-sectional view of the rotary valve unit of FIG. 8.
Figure 10:
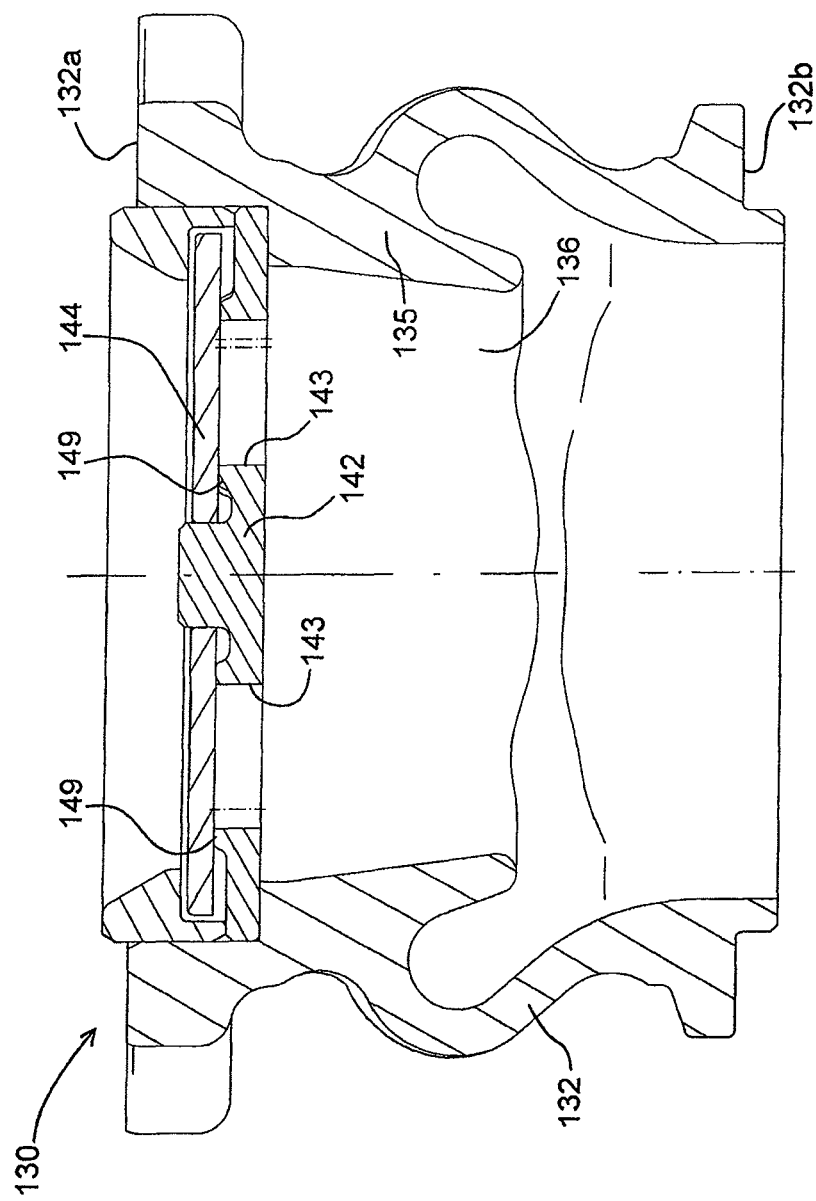
FIG. 10 is a further axial cross-sectional view of the rotary valve unit of FIG. 8.
Figure 11:
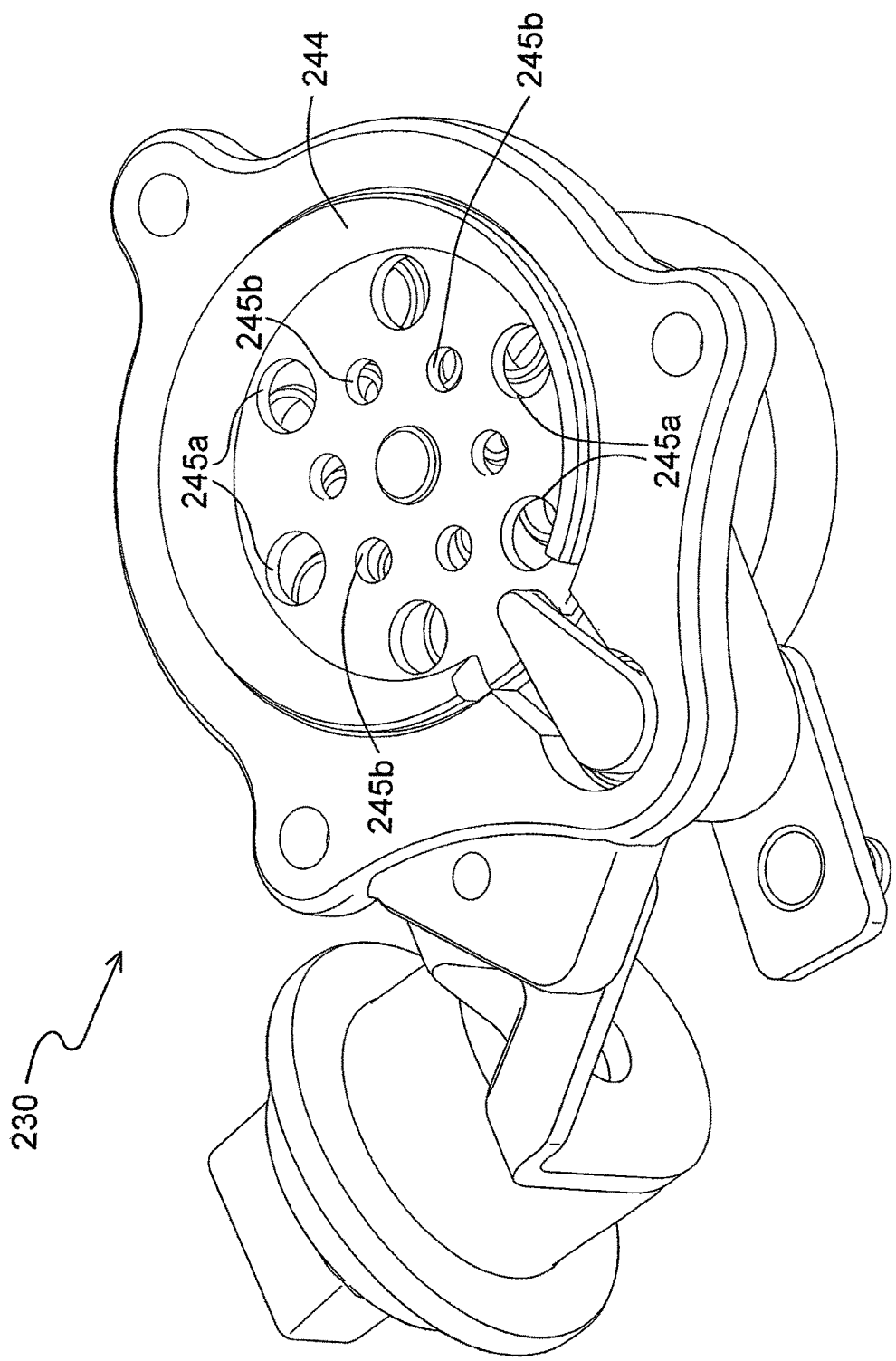
FIG. 11 is a perspective view of a rotary valve unit in accordance with a further embodiment of the invention.
Figure 12:
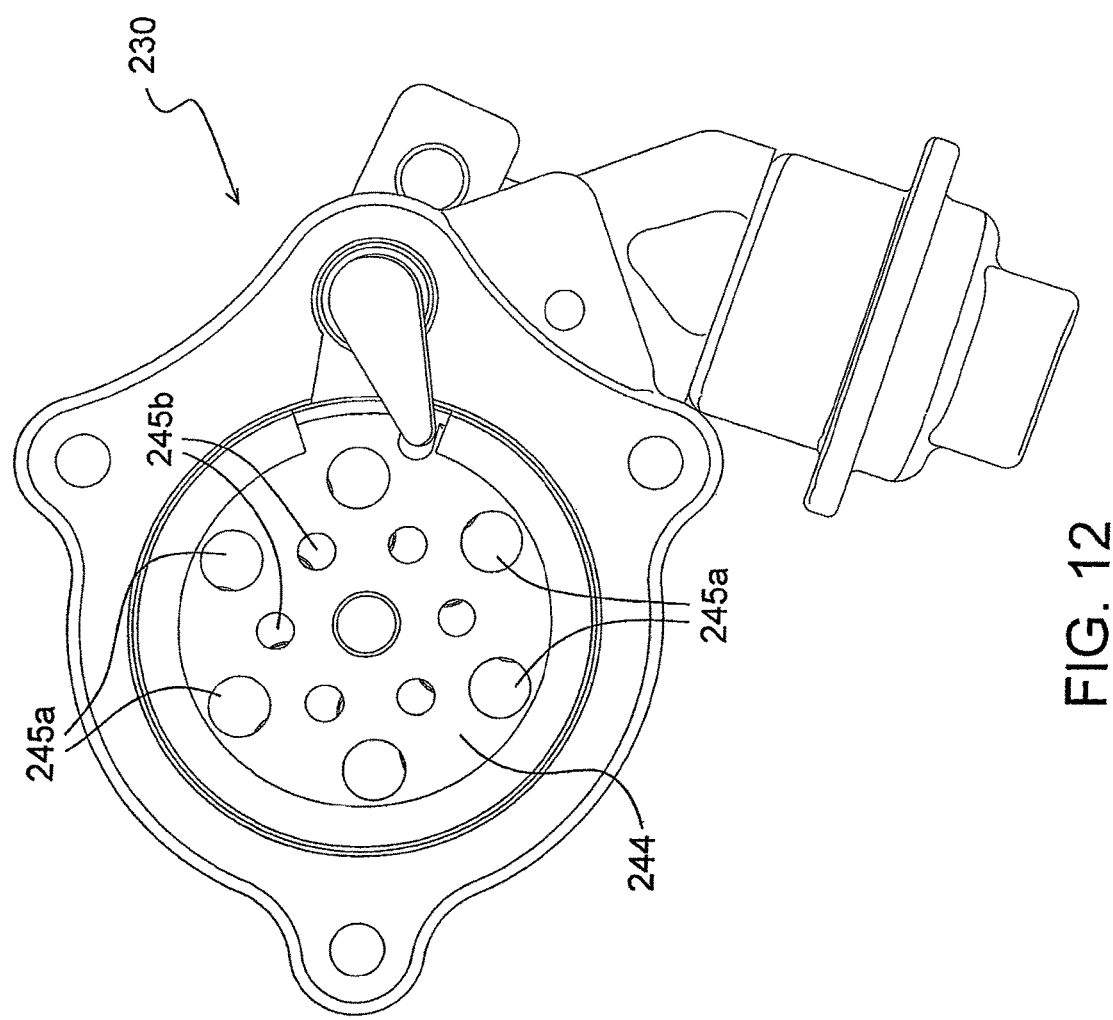
FIG. 12 is a side view of the rotary valve unit of FIG. 11.

With reference particularly to FIGS. 8 through 10, the rotary valve unit 130 includes a valve housing 132 having a first side 132a and an opposite second side 132b with respect to the direction of flow through the housing. The valve housing 132 includes a portion 133 (whose purpose, as further described below, is to collect turbine wheel outlet flow) that defines a first (or main) passage 134 whose inlet side is adjacent the first side 132a of the valve housing 132, and whose outlet side is located intermediate the first side 132a and the second side 132b of the housing 132. The housing 132 further includes a generally tubular portion 135 (whose purpose, as further described below, is to collect turbine wheel bypass flow) that defines a second (or bypass) passage 136 that is adjacent the first passage 134. An inlet side of the second passage 136 is adjacent the first side 132a of the housing and an outlet side of the second passage 136 is intermediate the first side 132a and the second side 132b. The housing 132 also includes a portion 137 that defines a third passage 138 whose inlet side is adjacent the outlet sides of the first and second passages 134 and 136, and whose outlet side is adjacent the second side 132b of the housing 132. Thus, the first, second, and third passages 134, 136, 138 are arranged in a generally "Y"-shaped configuration such that two flow streams passing through the first and second passages 134 and 136 are joined together as they enter the third passage 138 and exit the outlet side of the third passage 138 as a single flow stream. This arrangement allows a simple and direct connection to the catalytic converter (reducing wetted surface area and associated conduit volumes, thereby leading to quicker catalyst heating, reducing noise sensitivity, and increasing mechanical robustness of the overall installation).

The valve unit 130 further comprises a stationary valve seat 142 and a rotary valve member 144 in abutting engagement with the valve seat. The valve seat 142 and valve member 144 are arranged in the interior space of the tubular housing portion 135. The valve seat 142 abuts a shoulder defined by the housing portion 135, and is prevented from moving away from the shoulder by a retaining ring 139 that is secured (e.g., by press-fitting) in the opening of the housing portion 135, although during operation pressure of the exhaust gas urges the valve seat 142 (and the valve member 144) in the downstream direction. The valve member 144 is captive between the valve seat 142 and a flange or shoulder of the retaining ring 139, but is free to rotate about its axis and to move axially against the valve seat 142. As best seen in FIGS. 9 and 10, the valve member 144 defines a central bearing aperture that receives a protruding hub portion of the valve seat 142. The engagement of the hub portion in the bearing aperture keeps the valve seat and valve member coaxially positioned with respect to each other and allows the valve member to rotate about their common axis.

The valve seat 142 is a generally flat disk-shaped member having a plurality of orifices 143 (FIG. 10) circumferentially spaced apart about a circumference of the valve seat, the orifices 143 extending generally axially between the upstream and downstream faces of the valve seat. The orifices 143 can be uniformly or non-uniformly spaced about the circumference of the valve seat.

The rotary valve member 144 is a generally flat disk-shaped member having a plurality of orifices 145 (FIG. 8) circumferentially spaced apart about a circumference of the valve member, the orifices 145 extending generally axially between the upstream and downstream faces of the valve member. The orifices 145 can be uniformly or non-uniformly spaced about the circumference of the valve member. The number and spacing of the orifices 145 in the valve member can be the same as the number and spacing of the orifices 143 in the valve seat. However, as further described below, non-uniform spacing of the orifices 145 is also possible and can be advantageous in some circumstances; furthermore, the spacings of the orifices 143 and 145 do not have to be the same, and in some cases it can be advantageous for the spacings to be different.

The valve member 144 further defines a slot or opening 150 (FIG. 8) to receive the distal end 162 of an L-shaped drive arm 160 that is rigidly affixed to a distal (radially inner) end of a rotary drive member 170. The rotary drive member 170 passes through a bushing installed in a bore defined in the housing 132 (FIG. 9). The proximal end of the rotary drive member 170 is located outside the housing 132 and is rigidly affixed to a link 180. The link 180 has a connecting member 182 that is offset from the rotation axis of the rotary drive member 170 and that can be coupled to an actuator rod of an actuator 190 such that extension of the actuator rod causes the link 180 to rotate the rotary drive member 170 in one direction and retraction of the actuator rod causes the link to rotate the rotary drive member in the opposite direction. As a result, the drive arm 160 affixed to the distal end of the rotary drive member 170 in turn causes the valve member 144 to be rotated in one direction or the opposite direction about its axis.

With reference particularly to FIG. 10, each of the orifices 143 in the valve seat 142 has a raised pad 149 surrounding it. The pads 149 abut the planar face of the valve member 144 and serve as seals to help seal the interface between the valve member and valve seat. The provision of the raised pads 149 reduces the total surface area of the valve seat 142 in frictional contact with the rotary valve member 144, thereby reducing the total friction forces that the actuation system must overcome to rotate the valve member.

As depicted in FIG. 7, the valve unit 130 is coupled to the turbine of the turbocharger so that exhaust gas that has passed through the turbine wheel 126 is fed into the first (or main) flow passage 134 of the valve unit. A bypass passage (not shown) of the turbine is connected to the second (or bypass) flow passage 136 of the valve unit. When the valve unit 130 is closed (i.e., there is no overlap between the valve seat orifices 143 and the valve member orifices 145), flow through the second flow passage 136 is prevented, and accordingly all of the exhaust gas entering the turbine housing must flow through turbine wheel 126 and then through the first flow passage 134 of the valve unit. When the valve unit is fully open (i.e., there is maximum overlap between the orifices 143 and 145), exhaust gas can flow through the second flow passage 136 and thus the vast majority of the exhaust gas entering the turbine housing will bypass the turbine via the bypass passage and the second flow passage 136. When the valve unit is partially open, some exhaust gas may pass through the turbine wheel and the remainder bypasses the turbine wheel.

The housing 132 of the valve unit 130 defines a mounting flange 140 having holes 141 for fasteners for mounting the valve unit on another component such as an engine cylinder head. Alternatively, the housing 132 can be fully integrated as cast into the turbine housing inlet.

FIGS. 11 through 14 depict a valve unit 230 in accordance with another embodiment of the invention. Like the valve unit 130 described above, the valve unit 230 is particularly suited to a turbocharger/engine installation having a vertically oriented catalytic converter located at the turbine inlet volute or at the engine exhaust manifold outlet. However, unlike the installation described for the valve unit 130, the turbocharger/engine installation applicable to the valve unit 230 has a separate conduit for turbine wheel outlet flow. Thus, the valve unit 230 handles only bypass flow. In terms of its overall construction, the valve unit 230 is similar to the valve unit 30 described above. The chief difference is that the valve unit 230 includes a valve seat 242 and a valve member 244 each of which has two sets of orifices. Specifically, the valve seat 242 (best illustrated in FIGS. 13 and 14) is a generally flat disk-shaped member having a plurality of orifices 243a and 243b circumferentially spaced apart about a circumference of the valve seat, the orifices extending generally axially between the upstream and downstream faces of the valve seat. The orifices 243a are located at a relatively larger radius from the center of the valve seat 242, and the orifices 243b are at a relatively smaller radius from the center of the valve seat. The orifices 243a in the illustrated embodiment are uniformly spaced about the circumference of the valve seat, and likewise the orifices 243b are uniformly spaced (but with a different spacing from that of the orifices 243a), but as further described below, non-uniform spacing of the orifices is also possible and can be advantageous in some circumstances.

The rotary valve member 244 is a generally flat disk-shaped member having a plurality of orifices 245a and 245b circumferentially spaced apart about a circumference of the valve seat, the orifices extending generally axially between the upstream and downstream faces of the valve member. The orifices 245a are located at a relatively larger radius from the center of the valve member 244, and the orifices 245b are at a relatively smaller radius from the center of the valve member. The orifices 245a in the illustrated embodiment are uniformly spaced about the circumference of the valve member, and the number and spacing of the orifices 245a in the valve member are the same as the number and spacing of the orifices 243a in the valve seat. However, as further described below, non-uniform spacing of the orifices 245a is also possible and can be advantageous in some circumstances; furthermore, the spacings of the orifices 243a and 245a do not have to be the same, and in some cases it can be advantageous for the spacings to be different. Similarly, the orifices 245b in the illustrated embodiment are uniformly spaced about the circumference of the valve member, and the number and spacing of the orifices 245b in the valve member are the same as the number and spacing of the orifices 243b in the valve seat.

Figure 13:
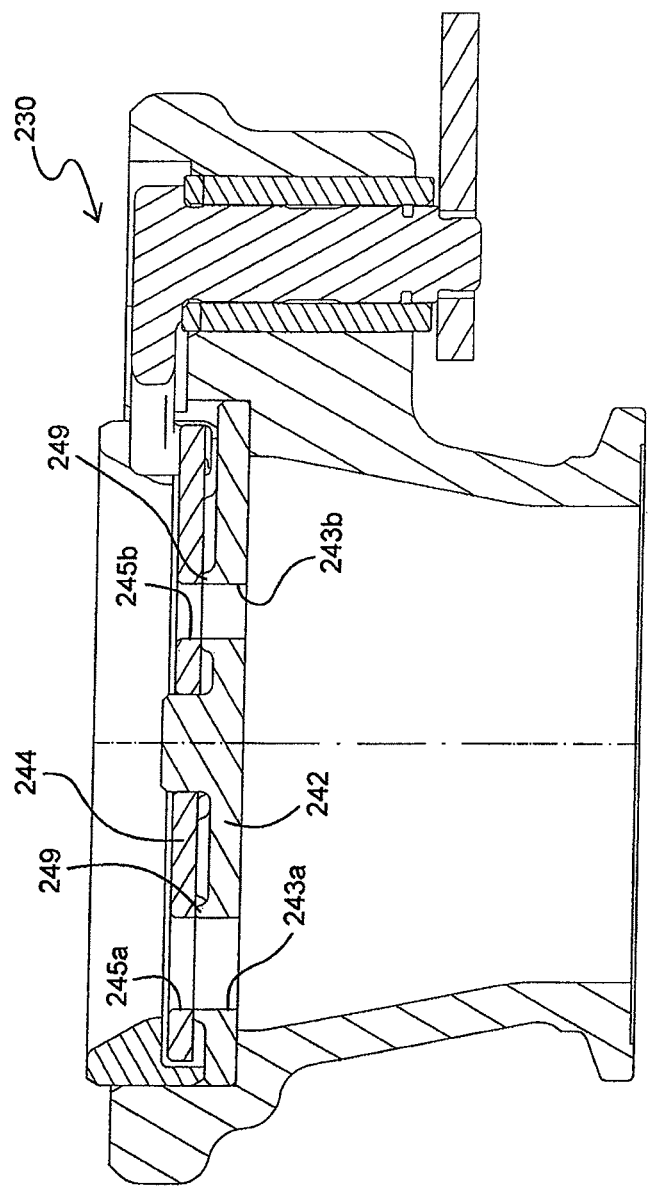
FIG. 13 is an axial cross-sectional view of the rotary valve unit of FIG. 11, with the valve shown open.
Figure 14:
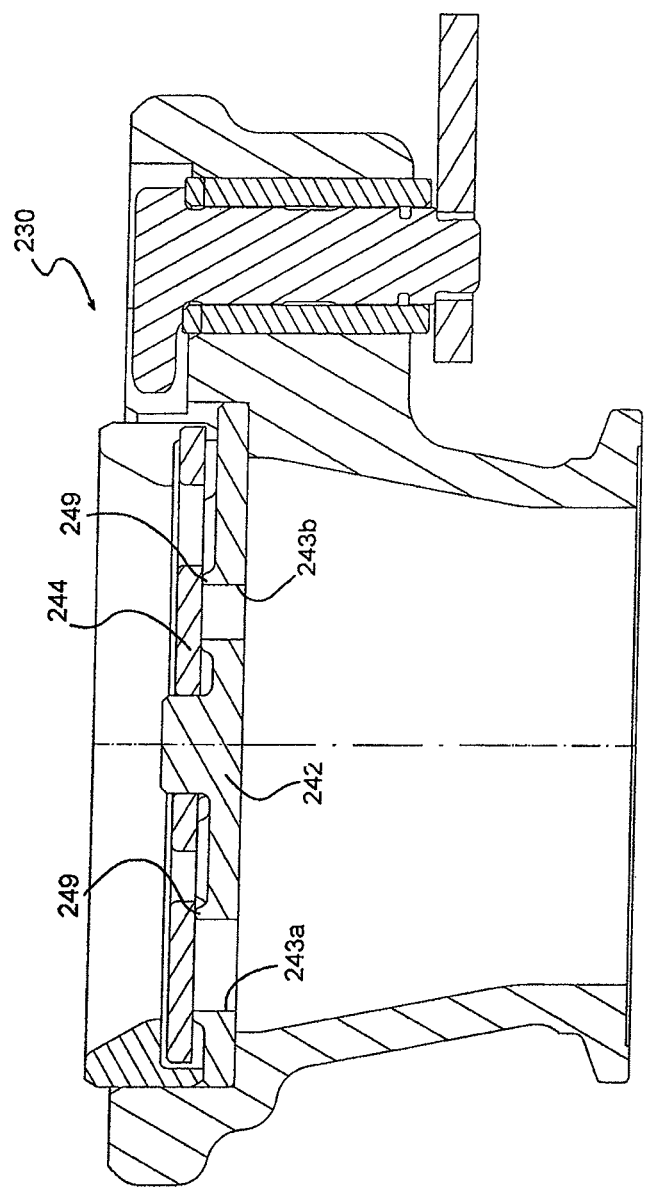
FIG. 14 is a view similar to FIG. 13, with the valve shown closed.

With reference particularly to FIGS. 13 and 14, each of the orifices 243a and 243b in the valve seat 242 has a raised pad 249 surrounding it. The pads 249 abut the planar face of the valve member 244 and serve as seals to help seal the interface between the valve member and valve seat. The provision of the raised pads 249 reduces the total surface area of the valve seat 242 in frictional contact with the rotary valve member 244, thereby reducing the total friction forces that the actuation system must overcome to rotate the valve member.

If desired or necessary in a particular application, surfaces of components in the valve unit 30, 130, 230 that relatively slide over one another can be coated with a friction/wear coating that reduces wear of the surfaces. For example, the raised pads 49, 149, 249 and/or the surface of the valve member 44, 144, 244 that the pads contact can be coated. Other surfaces that can be coated include the end of the L-shaped drive arm 90, 190 and/or the surfaces of the valve member 44, 144, 244 contacted by the end of the drive arm.

The wear coating can be formed of various materials, including an aluminum diffusion coating, a nickel boron coating, or a ceramic coating (e.g., silicon nitride). In order to avoid material transfer from one surface to an abutting surface, preferably the two surfaces are coated with different materials.

Rotary valve units in accordance with the invention as described herein are amenable to various applications in the turbocharger field. As an example, a rotary valve unit as described herein can be used in a two-stage turbocharger arrangement having a high-pressure (HP) turbocharger whose turbine can receive exhaust gases from an exhaust manifold of an engine, and a low-pressure (LP) turbocharger whose turbine is arranged in series with the HP turbine. The rotary valve unit can be arranged such that it is controllable to allow exhaust gases either to proceed from the exhaust manifold to the HP turbine, and subsequently to the LP turbine after having passed through the HP turbine, or to bypass the HP turbine and proceed from the exhaust manifold directly to the LP turbine. In such an arrangement, the HP turbine could be "wastegate-less" turbine. The rotary valve unit could be integrated into the LP turbine inlet.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger assembly comprising:
a compressor having a compressor wheel affixed to one end of a shaft;
a turbine having a turbine wheel affixed to an opposite end of the shaft;
a rotary valve unit comprising:
a valve housing assembly defining a first flow passage and a second flow passage therein, the first and second flow passages being separate from each other;
a fixed valve seat and a rotary valve member arranged within the second flow passage of the valve housing, the valve member being arranged coaxially with the valve seat relative to an axis, the valve member defining a plurality of circumferentially spaced valve member orifices and the valve seat defining a plurality of circumferentially spaced valve seat orifices, the valve member being disposed against the valve seat and being rotatable about the axis for selectively varying a degree of alignment between the valve member orifices and the valve seat orifices, ranging from no alignment defining a closed condition of the valve, to at least partial alignment defining an open condition of the valve, wherein the valve member and valve seat are arranged such that pressure of fluid flowing through the rotary valve unit acts on the valve member in a direction urging the valve member against the valve seat in the open condition of the valve,
the rotary valve unit being coupled with the turbine such that exhaust gas that has passed through the turbine wheel is fed into the first flow passage of the rotary valve unit, and exhaust gas that has bypassed the turbine wheel is fed into the second flow passage of the rotary valve unit.

2. The turbocharger assembly of claim 1, wherein one of the valve member and the valve seat includes raised pads surrounding the respective orifices therein, the pads being in contact with a substantially planar surface of the other of the valve member and the valve seat so as to provide sealing between the valve member and the valve seat.

3. The turbocharger assembly of claim 1, wherein the valve housing assembly comprises a main housing and a generally tubular housing insert installed in the main housing, a central passage through the housing insert defining the first flow passage, a generally annular space between the main housing and the housing insert defining the second flow passage.

4. The turbocharger assembly of claim 1, wherein the valve housing assembly has a first side and an opposite second side with respect to a direction of flow through the rotary valve unit, wherein the valve housing assembly includes a first portion defining the first flow passage and a second portion defining the second flow passage, wherein inlet sides of the first and second flow passages are located adjacent the first side of the valve housing assembly and outlet sides of the first and second flow passages are located intermediate the first and second sides of the valve housing assembly, and wherein the valve housing assembly further includes a third portion defining a third flow passage, an inlet side of the third flow passage being adjacent the outlet sides of the first and second flow passages, and an outlet side of the third flow passage being adjacent the second side of the valve housing assembly, the first and second flow passages being arranged to feed into the third flow passage, whereby fluid enters the rotary valve unit via the inlet sides of the first and second flow passages and exits the rotary valve unit via the outlet side of the third flow passage.

5. The turbocharger assembly of claim 4, wherein the valve seat comprises a flat disk-shaped member and the valve member comprises a flat disk-shaped member.

6. The turbocharger assembly of claim 5, further comprising a rotary drive member rotatably held in a bore defined in the valve housing assembly, and a drive arm having one end affixed to the rotary drive member and an opposite end engaged with the valve member, such that rotation of the rotary drive member causes the drive arm to pivot and thereby rotate the valve member about the axis.

7. The turbocharger assembly of claim 6, further comprising an actuator coupled with the rotary drive member.

* * * * *